3,123,606
2-(t-ALKYLAMINOALKYL)-IMIDAZOLINES AND TETRAHYDROPYRIMIDINES

Robert W. Fleming, Ann Arbor, Mich., assignor to Parke, Davis & Company, Detroit, Mich., a corporation of Michigan
No Drawing. Filed Oct. 9, 1961, Ser. No. 143,595
8 Claims. (Cl. 260—256.4)

The present invention relates to novel heterocyclic compounds having useful pharmacodynamic properties and to means for producing these compounds. More particularly, the invention relates to substituted heterocyclic compounds and salts thereof having in free base form the formula

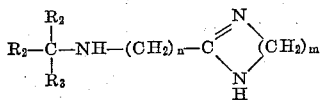

where $R_1$, $R_2$ and $R_3$ are the same or different and represent methyl or ethyl, $m$ is a whole number of 2 to 3, and $n$ is a whole number of 3 to 6.

In accordance with the invention, compounds having the above formula are produced by condensing an N-t-alkyl ω-cyanoalkylamine of the formula

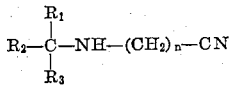

with an acid addition salt of an alkylene diamine compound of the formula, $NH_2$—$(CH_2)_m$—$NH_2$, where $R_1$, $R_2$, $R_3$, $m$ and $n$ have the foregoing significance. For the condensation, the use of substantially equivalent quantities of the reactants is preferred. The condensation is conveniently carried out at a temperature in the range from about 150 to 250° C. and preferably in the range from 175 to 200° C. When it is desired to carry the reaction to completion, the reaction mixture is heated until the evolution of ammonia ceases. At temperatures lower than 150° C., the reaction time may be unduly long, whereas at temperatures higher than 250° C. there is a tendency for decomposition of the desired product with consequent loss of yield. As indicated, the alkylene diamine starting material is used in the form of an acid addition salt. In general, salts of strong inorganic and organic acids are preferred, such as para-toluenesulfonic, sulfuric, hydrochloric, phosphoric and similar acids. The products are isolated from the reaction mixture by conventional procedures, either in free base form or acid addition salt form, as desired.

The N-t-alkyl ω-cyanoalkylamine starting materials of the invention can be prepared by refluxing in benzene one equivalent of α-bromo-ω-cyanoalkane with two equivalents of the appropriate tertiary alkylamine, removing the excess alkylamine and benzene from the reaction mixture by distillation, washing the residue with water and acid, basifying and extracting the combined washes with methylene chloride, and recovering the desired amine from the extract. The procedure is illustrated by the preparation of 5-t-butylvaleronitrile, as follows:

A solution of 5-bromovaleronitrile (7 kilos) and t-butylamine (7.8 kilos) in benzene (5 gallons), previously dried by azeotropic distillation, is refluxed for 23 hours.

A mixture of benzene/t-butylamine (18 liters) is then removed by distillation at atmospheric pressure, and the residue is washed with water (6 x 2 liters) and finally with sufficient dilute hydrochloric acid (15%) to ensure acidity. To the combined aqueous and acid washes is added at room temperature or lower a solution of sodium hydroxide (1.5 kilos) in water (2–3 liters), and the alkaline liquor is extracted with methylene chloride (3 x 3 liters). The methylene chloride is then evaporated. The residual product is 5-t-butylaminovaleronitrile, B.P. 90° (3 mm.). To increase the yield, the aqueous washes are further basified with sodium hydroxide (2 kilos) in water and after the addition of sodium chloride (1 kilo) they are extracted with methylene chloride (2 x 2.5 liters). After evaporation of the methylene chloride, followed by vacuum distillation, a further quantity of 5-t-butylaminovaleronitrile is obtained.

The boiling points of corresponding N-t-alkyl ω-cyanoalkylamines, prepared by this procedure from the respective bromoalkyl nitriles and t-alkylamines, are as follows:

| $R_1(R_2)(R_3)CNH$—$(CH_2)_n$—$CN$ | | | | Boiling Point Range, ° C./Pressure, mm. |
|---|---|---|---|---|
| $R_1$ | $R_2$ | $R_3$ | $n$ | |
| $CH_3$ | $CH_3$ | $CH_3$ | 3 | 102–105/19 |
| $CH_3$ | $CH_3$ | $CH_3$ | 5 | 130–132/15 |
| $C_2H_5$ | $C_2H_5$ | $CH_3$ | 4 | 140–142/15 |
| $C_2H_5$ | $C_2H_5$ | $C_2H_5$ | 4 | 154–156/15 |

The free base compounds of the invention form acid addition salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, benzenesulfonate and sulfamate. The acid addition salts are conveniently formed by mixing the free base with at least an equivalent amount, and for the preparation of di-salts at least two equivalents, of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where solid and essentially neutral product forms, as well as increased water solubility, are desired. The invention contemplates the acid salts broadly. Those salts which are unsuited to particular uses, as for example uses where toxicity is a problem, are useful as intermediates, being readily convertible to non-toxic acid salts by means which per se are known to those in the art.

The compounds of the invention possess significant ganglionic blocking activity and in some cases hypotensive activity, when administered by either the parenteral or oral routes. For example, it has been established by the test procedure of Chen et al., Arch. Int. Pharmacodyn., 96, 291 (1954), that an intravenous dose of less than one mg./kg. in the dog serves to block 50% of the pressor response induced by a standard dose of dimethylphenylpiperazinium iodide. The compound, 2-(4-t-butylaminobutyl)-2-imidazoline, and its acid addition salts possess outstanding activity in this regard and are therefore preferred. The compounds of the invention are relatively non-toxic and hence have application as ganglionic blocking agents or hypotensive agents.

The invention is illustrated by the following examples.

Example 1

(a) A mixture of 202 g. of ethylenediamine di-p-toluenesulfonate and 77 g. of 5-t-butylaminovaleronitrile is heated gradually to 190° C. with frequent stirring. The clear melt obtained is heated at 190–200° C. for 4 hours at which time the evolution of ammonia subsides. After cooling to below 100° C., the product is poured slowly into approximately 1.25 liters of water with rapid stirring so that no large glassy lumps are formed. When complete solution is obtained, 200 ml. of 40% sodium hydroxide solution is added and the alkaline mixture is extracted three times with 500-ml. portions of chloroform. The combined extracts are washed once with 250 ml. of water and dried over potassium carbonate. After removal of the bulk of the chloroform by distillation, the residue is distilled. The fraction boiling at 130° C. (0.2 mm.), 2-(4-t-butylaminobutyl)-2-imidazoline, is collected and dissolved in dry ether. An excess of isopropanolic hydrogen chloride is added to the ether solution and the resulting crystalline product which separates, 2-(4-t-butylaminobutyl)-2-imidazoline dihydrochloride, is collected; M.P. after recrystallization from isopropanol methanol (6:1), 273–274° C.

The dihydrobromide salt of 2-(4-t-butylaminobutyl)-2-imidazoline is prepared by dissolving the free base in ether and treating the resulting solution with an excess of dry hydrogen bromide. The product obtained is purified by recrystallization from isopropanol-methanol mixture. Likewise, the sulfate salt can be prepared by dissolving the base in an ethanol solution containing two equivalents of sulfuric acid. The salt is precipitated by addition of ether and purified by recrystallization from isopropanol-methanol mixture. The di-p-toluenesulfonate salt can be prepared by working up the initial reaction mixture described above according to salt-isolation procedures known per se. It can also be prepared by dissolving the free base in isopropanol and adding the solution to an isopropanolic solution containing an excess of p-toluenesulfonic acid. The salt is precipitated by the addition of ether and purified by recrystallization from isopropanol-methanol mixture.

The starting material, ethylenediamine di-p-toluenesulfonate, is prepared as follows: 760 grams of p-toluenesulfonic acid monohydrate is suspended in a solution of 1 liter of methanol and 100 ml. of water. The mixture is exactly neutralized to Congo red by the slow addition of approximately 120 grams of ethylenediamine. The mixture is allowed to become hot during the addition to facilitate stirring. After cooling in ice, the salt is filtered off and washed with 300 ml. of cold methanol; M.P. 340–345° C., after recrystallization from a mixture of methanol (3 l.) and water (400 ml.).

(b) By the same procedure set forth in (a) but substituting for 5-t-butylaminovaleronitrile an equimolar amount of 5-(1,1-diethylpropyl)-aminovaleronitrile or 5-(1-ethyl-1-methylpropyl)-aminovaleronitrile, at a reaction temperature of about 180° C., one obtains respectively 2-[4-(1,1-diethylpropylamino)-butyl]-2-imidazoline, B.P. 137–138° C. at 0.25 mm. and its dihydrochloride salt, M.P. 206–207° C. or 2-[4-(1-ethyl-1-methylpropylamino)-butyl]-2-imidazoline, B.P. 142–144° C. at 0.06 mm. and its dihydrochloride salt, M.P. 200–201.5° C.

Example 2

A mixture of ethylenediamine di-p-toluenesulfonate (202 g.) and 4-t-butylaminobutyronitrile (70 g.) is heated gradually with frequent stirring to provide a clear melt and heating is continued at 180–200° C. until evolution of ammonia ceases. The reaction mixture is cooled and poured slowly into 1.25 liters of water with stirring to prevent lump formation. Stirring is continued to provide a clear solution, 175 ml. of 40% sodium hydroxide solution is added, and the alkaline mixture is extracted successively with three 500-ml. portions of chloroform. The combined chloroform extracts are washed with 300 ml. of water, dried over anhydrous potassium carbonate and filtered. The chloroform is removed from the filtrate by vacuum distillation and the residue is taken up in dry ether. An excess of isopropanolic hydrogen chloride is added to the ether solution and the solid product which separates, 2-(3-t-butylaminopropyl)-2-imidazoline dihydrochloride, is collected. The product melts at 275–276° C. after recrystallization from isopropanol-methanol (6:1) mixture.

By the same procedure, substituting as a starting material 6-t-butylaminocapronitrile (84 g.) for 4-t-butylaminobutyronitrile, one obtains 2-(5-t-butylaminopentyl)-2-imidazoline dihydrochloride as the monohydrate; M.P. 147–148.5° C. Also by the same procedure, substituting trimethylenediamine di-p-toluenesulfonate (209 g.) for ethylenediamine di-p-toluenesulfonate, one obtains 2-(3-t-butylaminopropyl)-2-(1,4,5,6-tetrahydro)-pyrimidine dihydrochloride; M.P. 273–274° C.

Example 3

A mixture of ethylenediamine dihydrochloride (66.5 g.) of 6-t-butylaminoenanthylonitrile (91 g.) is heated to 190° C. with continuous stirring. Heating is continued at 210–220° C. until evolution of ammonia ceases. The reaction mixture is cooled and poured slowly with rapid stirring into water (one liter) and the resulting solution is basified with 10% aqueous sodium hydroxide solution and extracted successively with three 400-ml. portions of methylene chloride. To the combined extracts is added an excess of isopropanolic hydrogen chloride. The desired product, 2-(6-t-butylaminohexyl)-2-imidazoline dihydrochloride, is collected by filtration and purified by recrystallization from isopropanol-methanol mixture (6:1).

I claim:
1. A compound of the class consisting of a free base and its acid addition salts, said free base of the formula

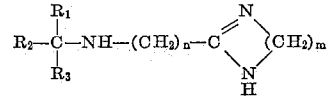

where $R_1$, $R_2$ and $R_3$ individually represent a member of the class consisting of methyl and ethyl, $m$ is a whole number of 2 to 3 and $n$ is a whole number of 3 to 6.

2. An acid addition salt of 2-(4-t-butylaminobutyl)-2-imidazoline.

3. 2 - (4 - t - butylaminobutyl) - 2 - imidazoline dihydrochloride.

4. 2-(4-t-butylaminobutyl)-2-imidazoline.

5. 2 - (5 - t - butylaminopentyl) - 2 - imidazoline dihydrochloride.

6. 2 - [4 - (1,1 - diethylpropylamino) - butyl] - 2 - imidazoline dihydrochloride.

7. An acid addition salt of 2-(3-t-butylaminopropyl)-2-(1,4,5,6-tetrahydro)-pyrimidine.

8. 2 - (3 - t - butylaminopropyl) - 2 - (1,4,5,6 - tetrahydro)-pyrimidine dihydrochloride.

References Cited in the file of this patent

UNITED STATES PATENTS 2,252,722    Miescher et al. _____ Aug. 19, 1941

OTHER REFERENCES

Oxley et al.: J. Chemical Society, 1947, pages 497–505.